US010591692B2

(12) United States Patent
Raven et al.

(10) Patent No.: US 10,591,692 B2
(45) Date of Patent: Mar. 17, 2020

(54) OPTICAL DISTRIBUTION FRAMES

(71) Applicant: AFL IG LLC, Duncan, SC (US)

(72) Inventors: Asher Leong Raven, Milton Keynes (GB); Robert Dennelly, Mill Creek, WA (US)

(73) Assignee: AFL IG LLC, Duncan, SC (US)

(*) Notice: Subject to any disclaimer, the term of this patent is extended or adjusted under 35 U.S.C. 154(b) by 0 days.

(21) Appl. No.: 15/928,839

(22) Filed: Mar. 22, 2018

(65) Prior Publication Data
US 2019/0196127 A1 Jun. 27, 2019

Related U.S. Application Data

(60) Provisional application No. 62/610,688, filed on Dec. 27, 2017.

(51) Int. Cl.
G02B 6/44 (2006.01)
H04Q 1/02 (2006.01)

(52) U.S. Cl.
CPC .......... *G02B 6/4452* (2013.01); *G02B 6/447* (2013.01); *H04Q 1/13* (2013.01)

(58) Field of Classification Search
CPC ...................................... G03B 6/44
USPC ........................................ 385/135
See application file for complete search history.

(56) References Cited

U.S. PATENT DOCUMENTS

| | | | | | |
|---|---|---|---|---|---|
| 5,825,962 | A | * | 10/1998 | Walters | G02B 6/4452 385/135 |
| 5,946,440 | A | * | 8/1999 | Puetz | G02B 6/4455 385/135 |
| 6,424,781 | B1 | * | 7/2002 | Puetz | G02B 6/4452 385/135 |
| 6,535,682 | B1 | * | 3/2003 | Puetz | G02B 6/4452 385/135 |
| 6,556,763 | B1 | * | 4/2003 | Puetz | G02B 6/4452 385/135 |
| 6,760,531 | B1 | * | 7/2004 | Solheid | G02B 6/3897 385/135 |

(Continued)

FOREIGN PATENT DOCUMENTS

WO WO2007/149215 A2 12/2007

OTHER PUBLICATIONS

AFL Telecommunications LLC; International Patent Application No. PCT/US2018/066413, International Search Report; dated Apr. 24, 2019; (2 pages).

*Primary Examiner* — Kaveh C Kianni
(74) *Attorney, Agent, or Firm* — Dority & Manning, P.A.

(57) ABSTRACT

An optical distribution frame defining a coordinate system having a mutually orthogonal longitudinal axis, transverse axis, and lateral axis includes a body extending along the longitudinal axis between a top and a bottom, the body including a front and a rear separated from each other along the transverse axis. The front includes a central portion, a first outer portion, and a second outer portion, the first and second outer portions bordering the central portion and angled inwardly relative to the lateral axis towards each other. The optical distribution frame further includes a first patch body disposed on the first outer portion, the first patch body including a plurality of adapters, and a second patch body disposed on the second outer portion, the second patch body including a plurality of adapters.

22 Claims, 16 Drawing Sheets

(56) References Cited

U.S. PATENT DOCUMENTS

| | | | | |
|---|---|---|---|---|
| 7,120,348 B2* | 10/2006 | Trebesch | G02B 6/4452 | 385/135 |
| 8,229,265 B2* | 7/2012 | Solheid | G02B 6/483 | 385/134 |
| 9,715,075 B2* | 7/2017 | Solheid | G02B 6/4452 | |
| 2002/0118943 A1* | 8/2002 | Solheid | G02B 6/4452 | 385/134 |
| 2004/0013387 A1* | 1/2004 | Wakileh | G02B 6/4452 | 385/134 |
| 2004/0175088 A1* | 9/2004 | Dagley | G02B 6/4452 | 385/135 |
| 2004/0175089 A1* | 9/2004 | Dagley | G02B 6/4452 | 385/135 |
| 2006/0008231 A1* | 1/2006 | Reagan | G02B 6/3849 | 385/135 |
| 2008/0145013 A1* | 6/2008 | Escoto | G02B 6/4441 | 385/135 |
| 2010/0068923 A1 | 3/2010 | Tabet | | |
| 2011/0026894 A1* | 2/2011 | Rudenick | G02B 6/445 | 385/135 |
| 2011/0103761 A1* | 5/2011 | LeBlanc | G02B 6/4441 | 385/135 |
| 2011/0228473 A1* | 9/2011 | Anderson | G02B 6/4452 | 361/679.58 |
| 2011/0274403 A1* | 11/2011 | LeBlanc | G02B 6/4452 | 385/135 |
| 2012/0234778 A1* | 9/2012 | Anderson | G02B 6/4452 | 211/26.2 |
| 2012/0293390 A1* | 11/2012 | Shoemaker | H01Q 1/007 | 343/853 |
| 2013/0028567 A1* | 1/2013 | Parikh | G02B 6/4452 | 385/135 |
| 2014/0029908 A1* | 1/2014 | Courchaine | G02B 6/44 | 385/135 |
| 2014/0086545 A1* | 3/2014 | Solheid | G02B 6/4453 | 385/135 |
| 2015/0212286 A1* | 7/2015 | Vongseng | G02B 6/4455 | 385/135 |
| 2015/0286022 A1* | 10/2015 | Holmberg | G02B 6/4452 | 385/135 |
| 2016/0047999 A1* | 2/2016 | Alexi | G02B 6/4452 | 385/135 |
| 2016/0116697 A1* | 4/2016 | Kostecka | G02B 6/4454 | 385/135 |
| 2018/0074275 A1* | 3/2018 | Thompson | G02B 6/4454 | |
| 2018/0081139 A1* | 3/2018 | Geens | G02B 6/4452 | |
| 2018/0113268 A1* | 4/2018 | Van Baelen | G02B 6/3825 | |
| 2018/0129006 A1* | 5/2018 | Solheid | G02B 6/4452 | |
| 2018/0335595 A1* | 11/2018 | Takeuchi | H04Q 1/025 | |
| 2018/0372977 A1* | 12/2018 | Vermeulen | G02B 6/4455 | |
| 2019/0129115 A1* | 5/2019 | Solheid | G02B 6/4452 | |
| 2019/0137712 A1* | 5/2019 | Holmberg | G02B 6/4452 | |
| 2019/0137716 A1* | 5/2019 | Solheid | G02B 6/4455 | |

\* cited by examiner

OPTICAL DISTRIBUTION FRAMES

PRIORITY STATEMENT

The present application claims priority to U.S. Provisional Patent Application Ser. No. 62/610,688, filed Dec. 27, 2017, which is incorporated by reference herein in its entirety.

FIELD

The present disclosure relates generally to optical distribution frames, and more particularly to optical distribution frames with improved organizational features for use in large-scale data centers.

BACKGROUND

Very large data centers (some of which are sometimes referred to as hyperscale data centers) require extremely high fiber count cabling to enter and exit the building with the ability to distribute these optical paths across many locations within the building. In many cases, the number of fibers utilized in such data centers is in the range of tens of thousands of fibers.

Equipment frames, i.e. optical distribution frames, are provided in such buildings for providing connections between various fibers, thus forming the required optical paths. Due to the high fiber counts, keeping the fibers and connections thereof organized within the equipment frames is a key operational requirement for these data centers. However, the space requirements for the equipment frames can become a limiting factor, with data centers requiring a small footprint, high density, easily accessible solution which must accommodate patching and/or splicing of cabling entering the building. In some cases, for example, the minimum requirements include the accommodation of greater than or equal to 6912 fiber connectors in a maximum footprint of 900 millimeters (mm)×900 mm×2300 mm.

Accordingly, improved optical distribution frames are desired. For example, optical distribution frames with improved organizational capabilities, and which are capable of meeting minimum space and fiber count requirements, would be advantageous.

BRIEF DESCRIPTION

Aspects and advantages of the invention will be set forth in part in the following description, or may be obvious from the description, or may be learned through practice of the invention.

In accordance with one embodiment, an optical distribution frame defining a coordinate system having a mutually orthogonal longitudinal axis, transverse axis, and lateral axis is provided. The optical distribution frame includes a body extending along the longitudinal axis between a top and a bottom, the body including a front and a rear separated from each other along the transverse axis. The front includes a central portion, a first outer portion, and a second outer portion, the first and second outer portions bordering the central portion and angled inwardly relative to the lateral axis towards each other. The optical distribution frame further includes a first patch body disposed on the first outer portion, the first patch body including a plurality of adapters, and a second patch body disposed on the second outer portion, the second patch body including a plurality of adapters.

In some embodiments, the frame may further include a plurality of cable retainers disposed on the central portion.

In some embodiments, the frame may further include a plurality of spools disposed on the central portion.

In accordance with another embodiment, an optical distribution frame defining a coordinate system having a mutually orthogonal longitudinal axis, transverse axis, and lateral axis is provided. The optical distribution frame includes a body extending along the longitudinal axis between a top and a bottom, the body including a front and a rear separated from each other along the transverse axis. The front includes a central portion, a first outer portion, and a second outer portion, the first and second outer portions bordering the central portion and angled inwardly relative to the lateral axis towards each other. The optical distribution frame further includes a plurality of first patch panels disposed on the first outer portion, each of the plurality of first patch panel including a plurality of adapters. The optical distribution frame further includes a plurality of second patch panels disposed on the second outer portion, each of the plurality of second patch panels including a plurality of adapters. The optical distribution frame further includes a plurality of groups of cable retainers disposed on the central portion.

In some embodiments, each of the plurality of first patch panels further includes a routing indicia, wherein the routing indicia of each of the plurality of first patch panels is different from the others of the plurality of first patch panels. In some embodiments, each of the plurality of second patch panels further includes a routing indicia, wherein the routing indicia of each of the plurality of second patch panels is different from the others of the plurality of second patch panels. In some embodiments, each of the plurality of groups of cable retainers including a routing indicia, wherein the routing indicia of each group of cable retainers is different from the others of the plurality of groups of cable retainers.

In accordance with another embodiment, an optical distribution frame defining a coordinate system having a mutually orthogonal longitudinal axis, transverse axis, and lateral axis is provided. The optical distribution frame includes a body extending along the longitudinal axis between a top and a bottom, the body including a front and a rear separated from each other along the transverse axis. The front includes a central portion, a first outer portion, and a second outer portion, the first and second outer portions bordering the central portion and angled inwardly relative to the lateral axis towards each other. The optical distribution frame further includes a first removable patch module disposed on the first outer portion, the first removable patch module including a plurality of adapters. The optical distribution frame further includes a second removable patch module disposed on the second outer portion, the second removable patch module including a plurality of adapters.

In some embodiments, the frame may further include a plurality of spools disposed in the central portion. The plurality of spools may include a plurality of first side spools disposed in a longitudinal array and a plurality of first central spools disposed in a longitudinal array. The plurality of spools may further include a plurality of second side spools disposed in a longitudinal array and a plurality of second central spools disposed in a longitudinal array.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
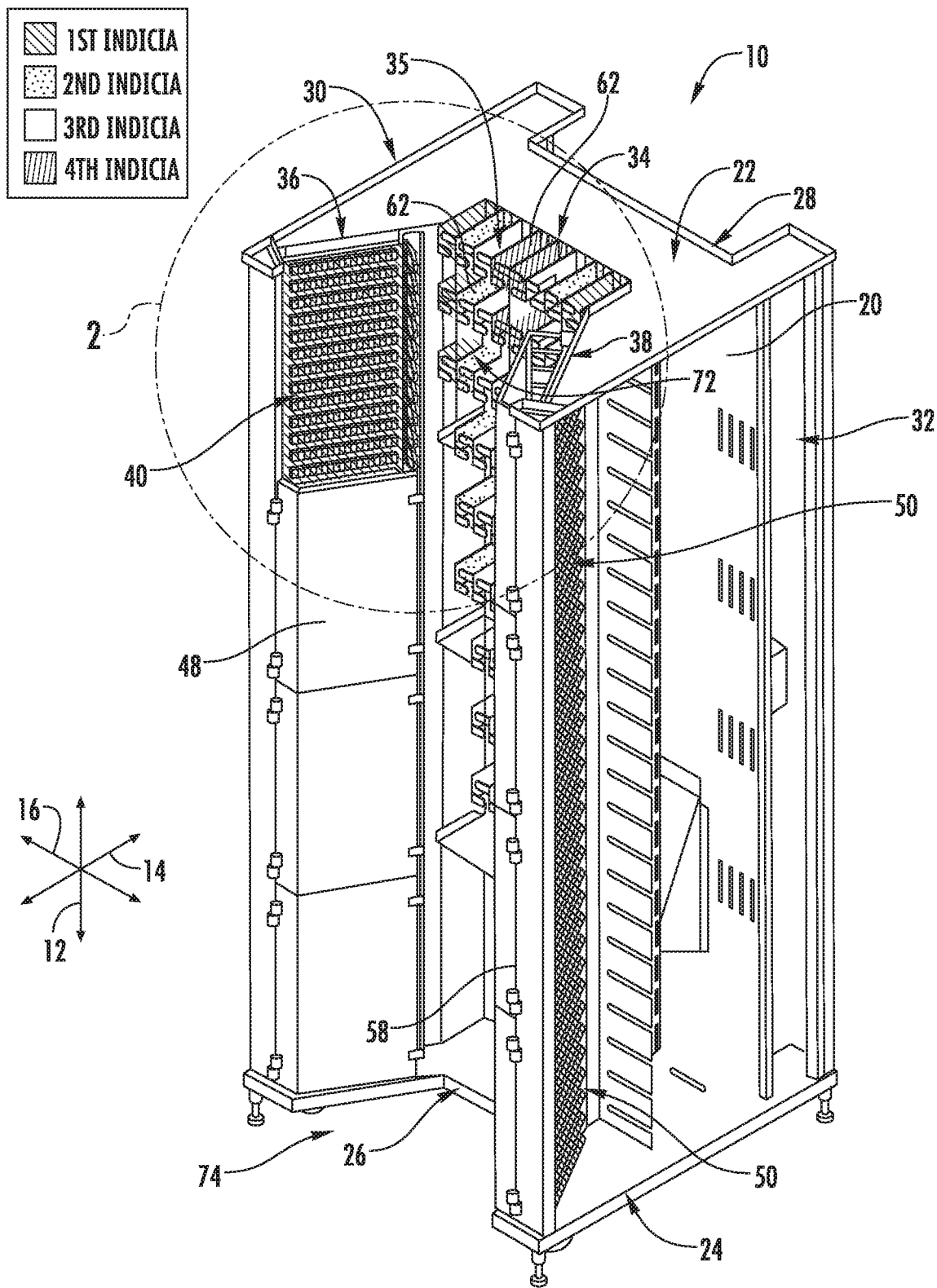
FIG. 1 is a perspective view of an optical distribution frame, with one panel cover removed, in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
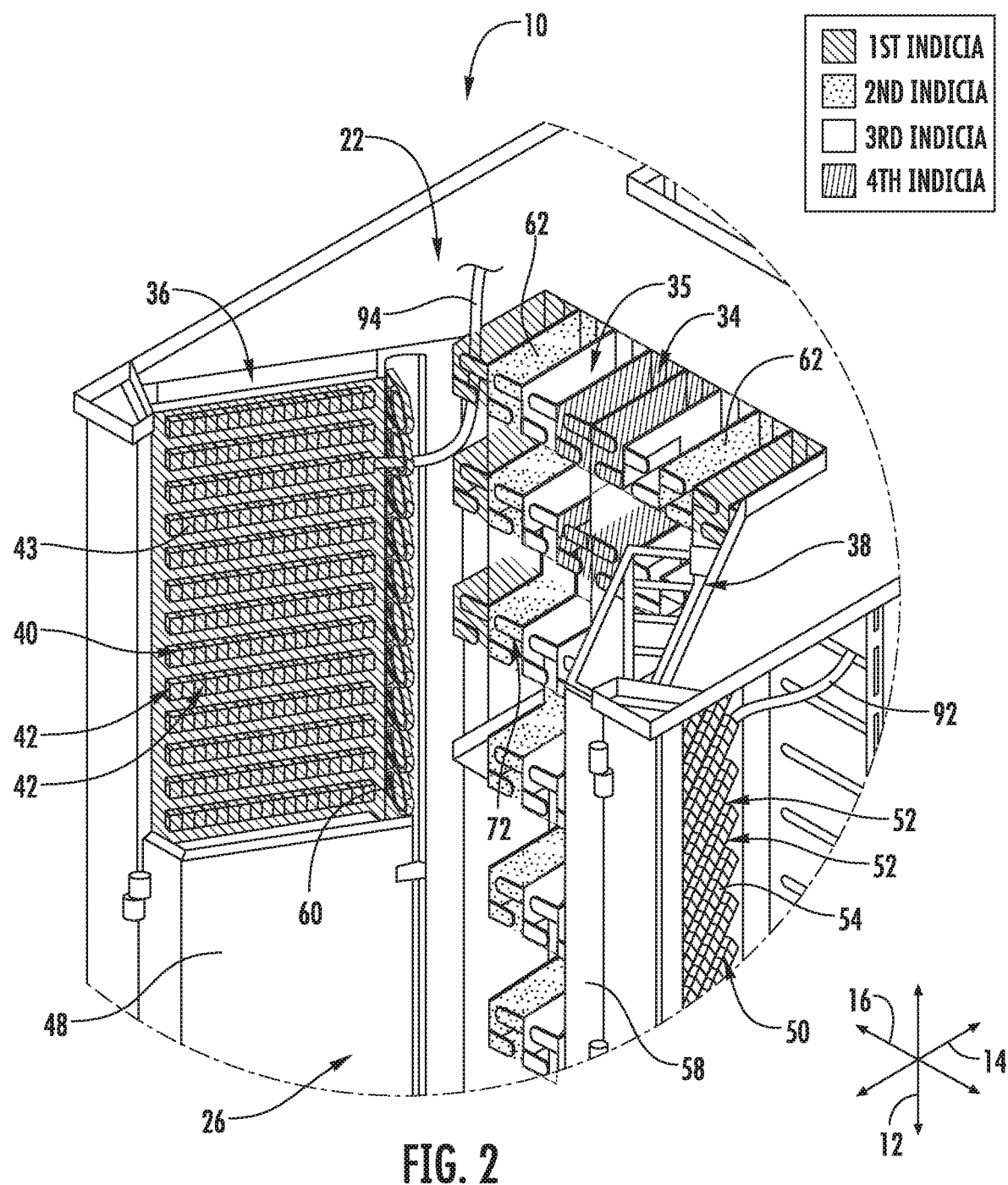
FIG. 2 is a close-up view of detail 1-1 of FIG. 1.
Figure 3:
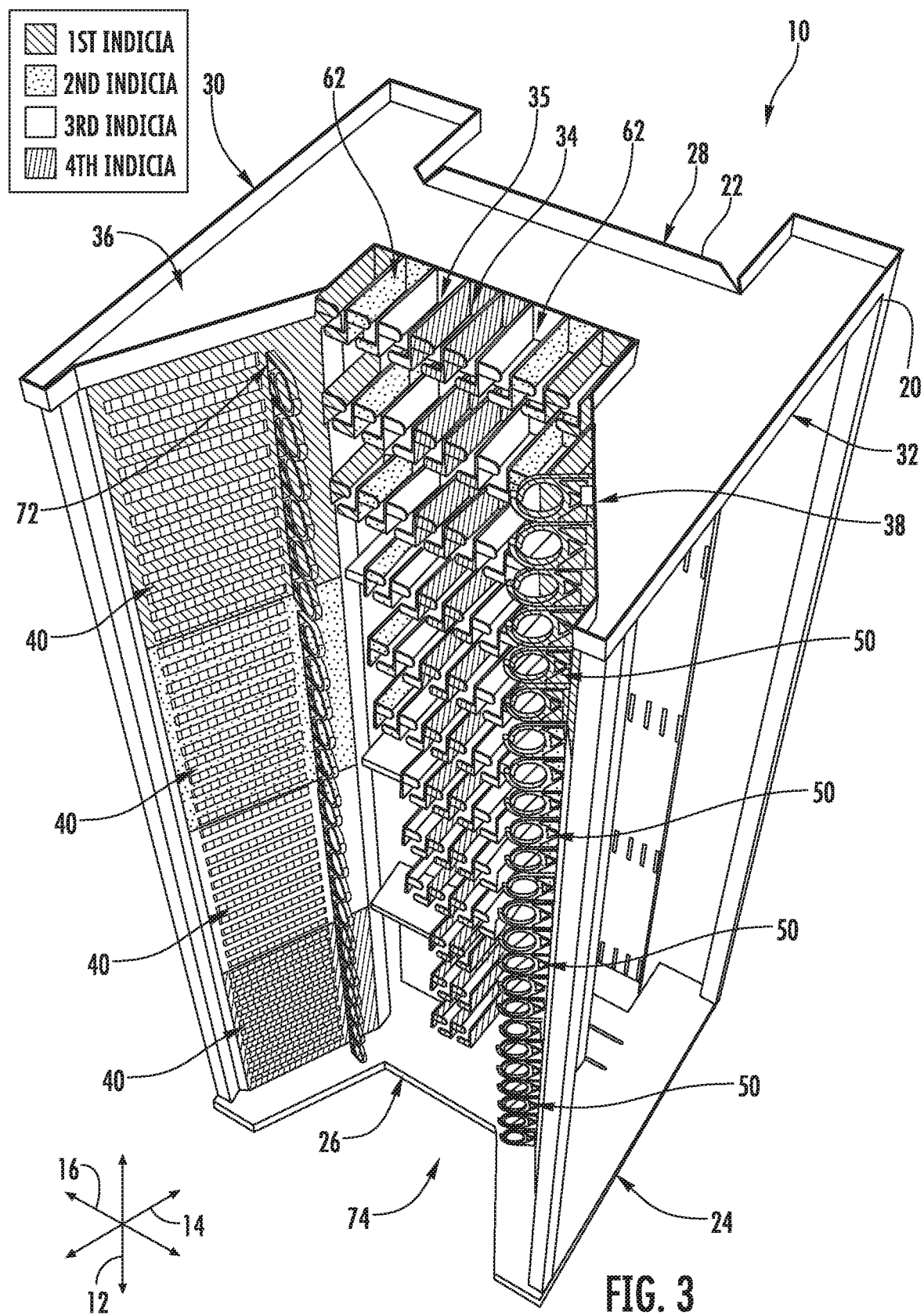
FIG. 3 is a perspective view of an optical distribution frame with panel covers removed in accordance with embodiments of the present disclosure.
Figure 4:
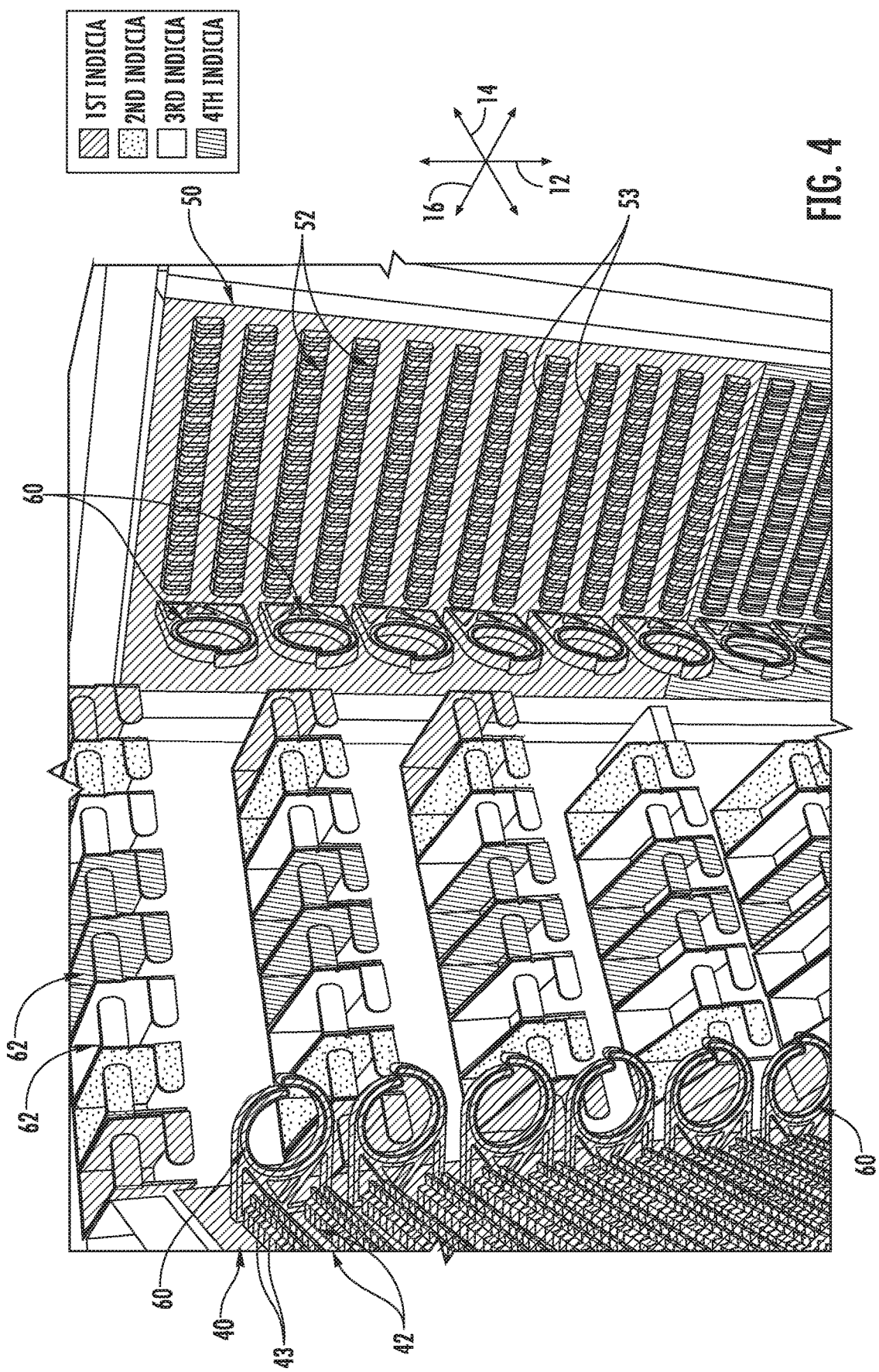
FIG. 4 is a close-up perspective view of a portion of an optical distribution frame in accordance with embodiments of the present disclosure.
Figure 5:
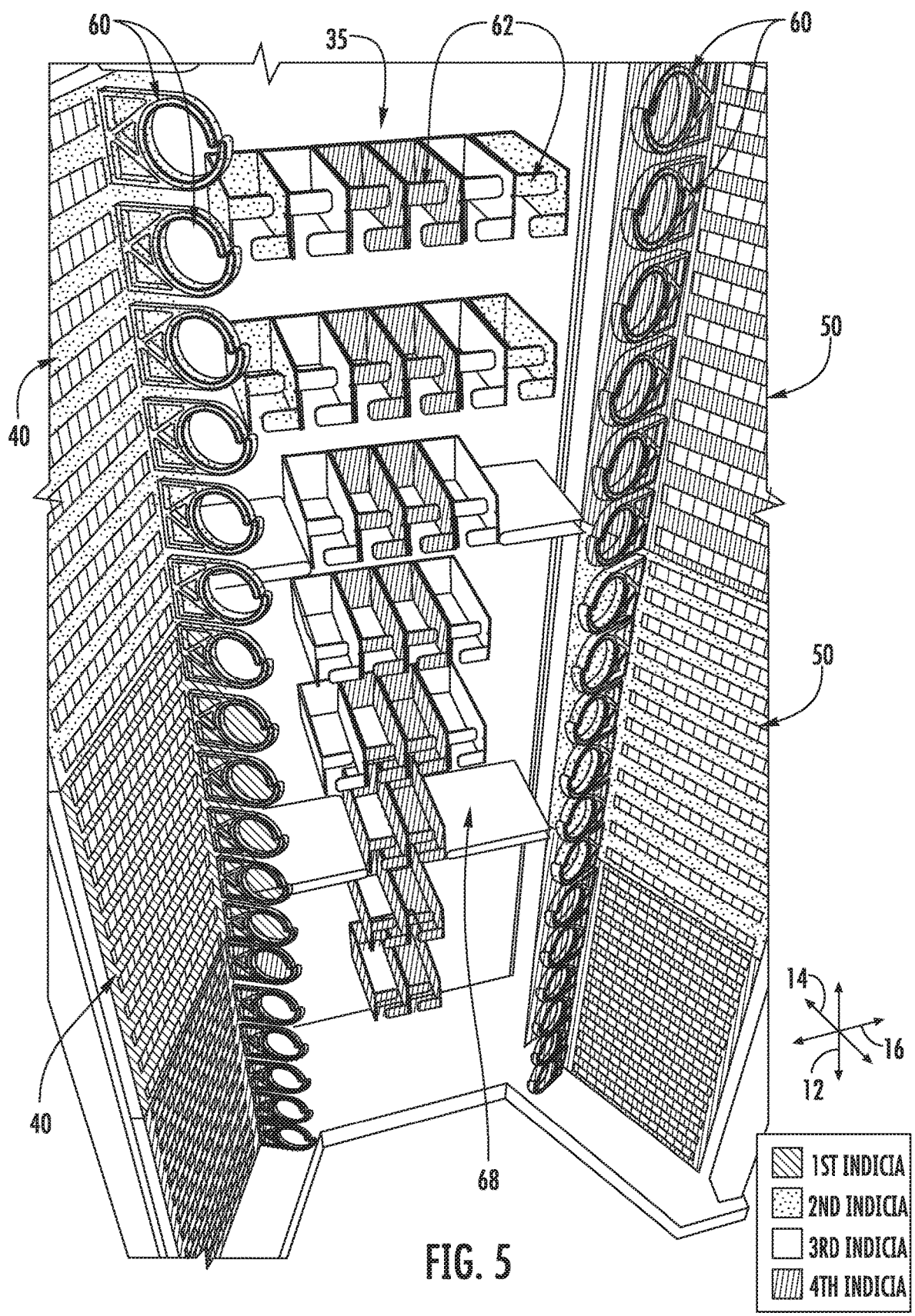
FIG. 5 is a perspective view of a portion of an optical distribution frame with dividers installed in accordance with embodiments of the present disclosure.
Figure 6:
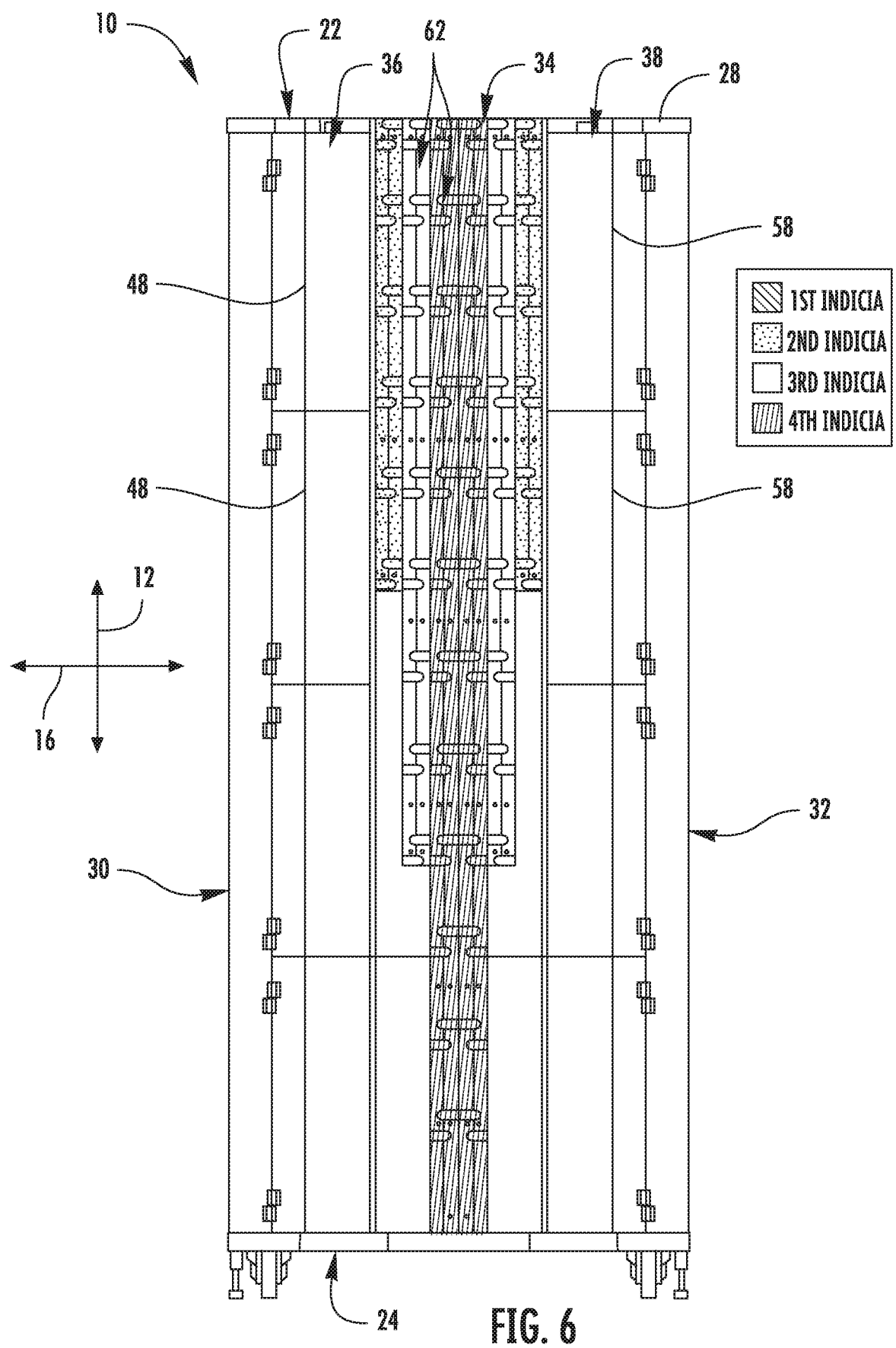
FIG. 6 is a front view of an optical distribution frame in accordance with embodiments of the present disclosure.
Figure 7:
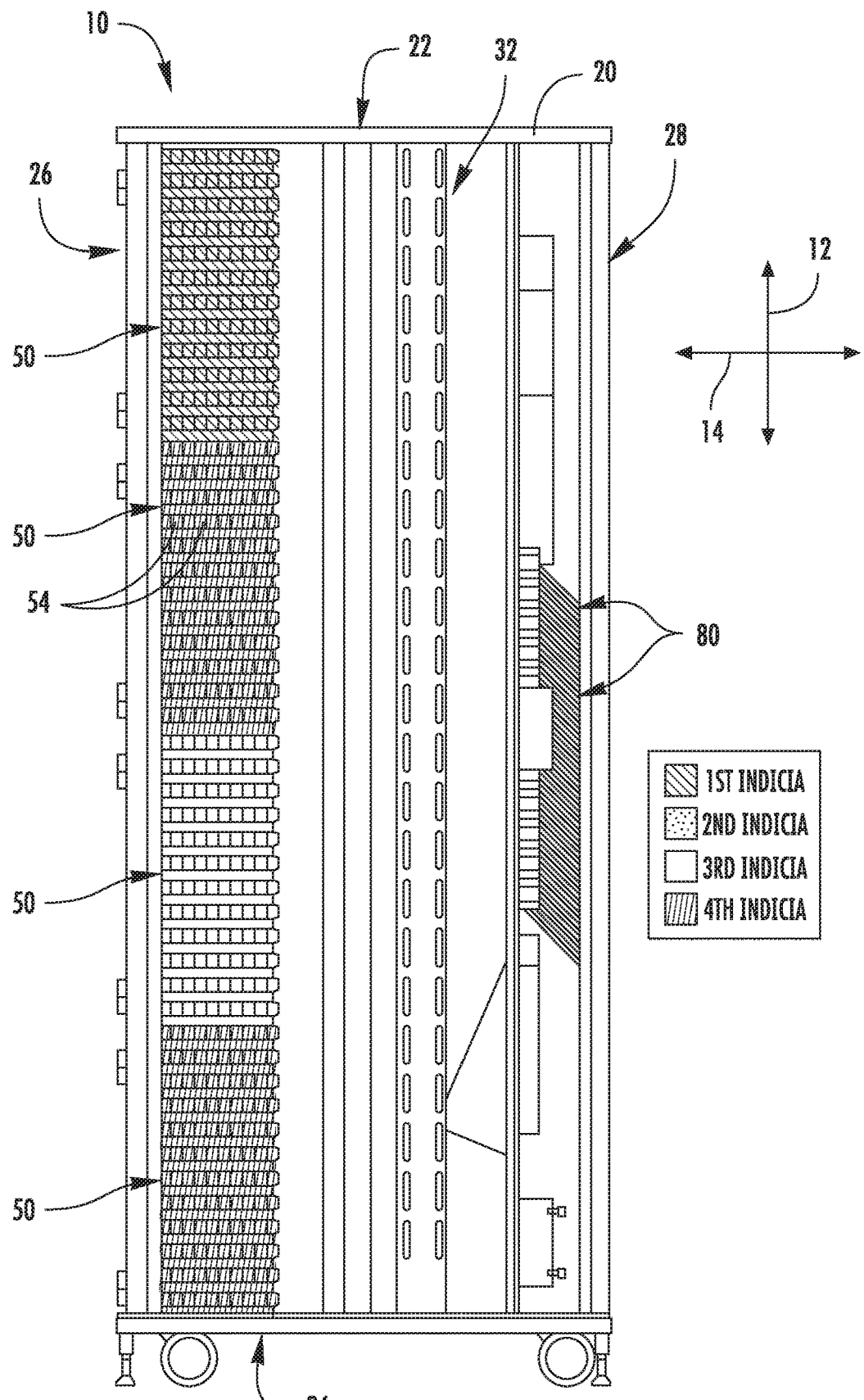
FIG. 7 is a side view of an optical distribution frame in accordance with embodiments of the present disclosure.
Figure 8:
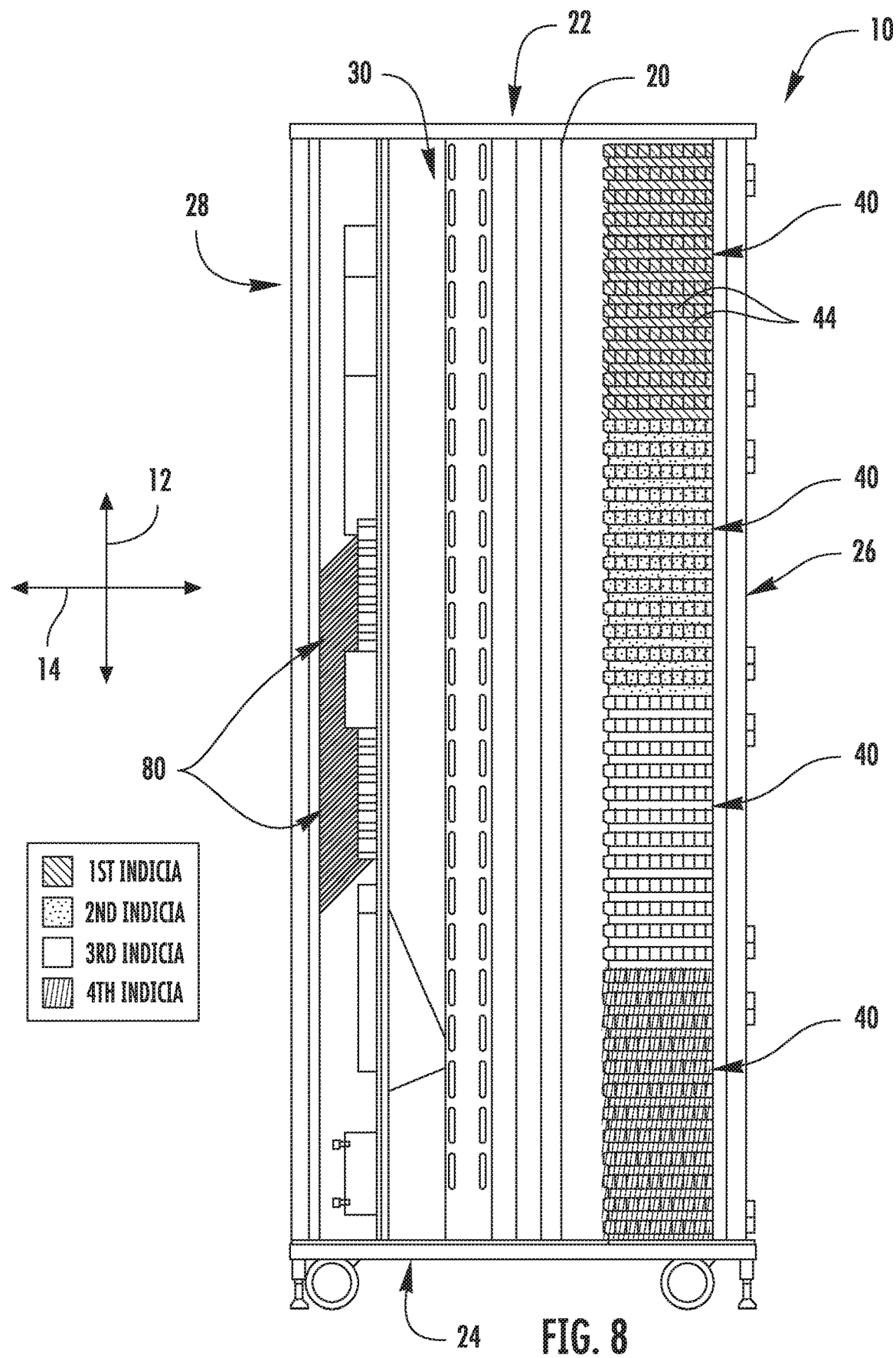
FIG. 8 is an opposing side view of an optical distribution frame in accordance with embodiments of the present disclosure.
Figure 9:
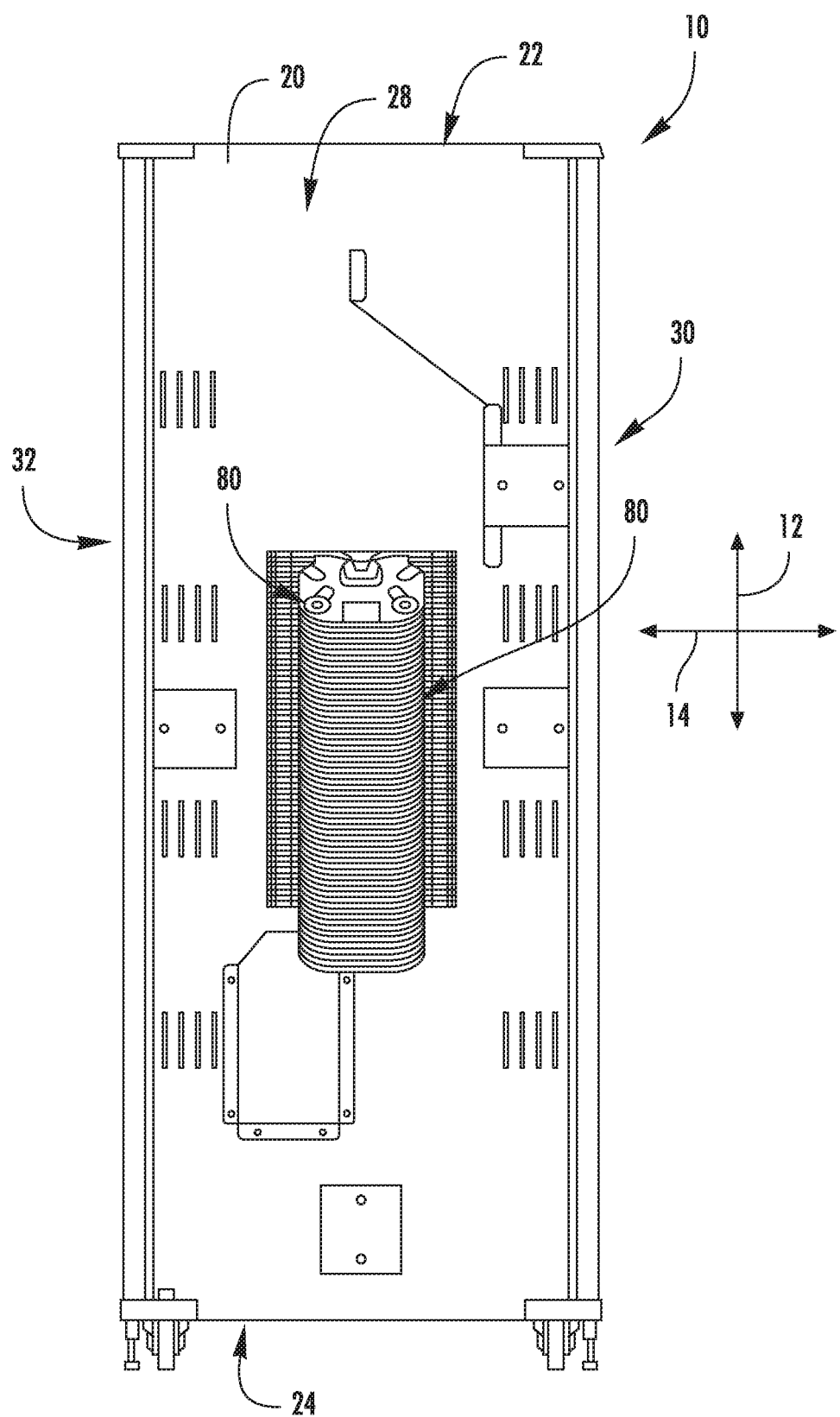
FIG. 9 is a rear view of an optical distribution frame in accordance with embodiments of the present disclosure.
Figure 10:
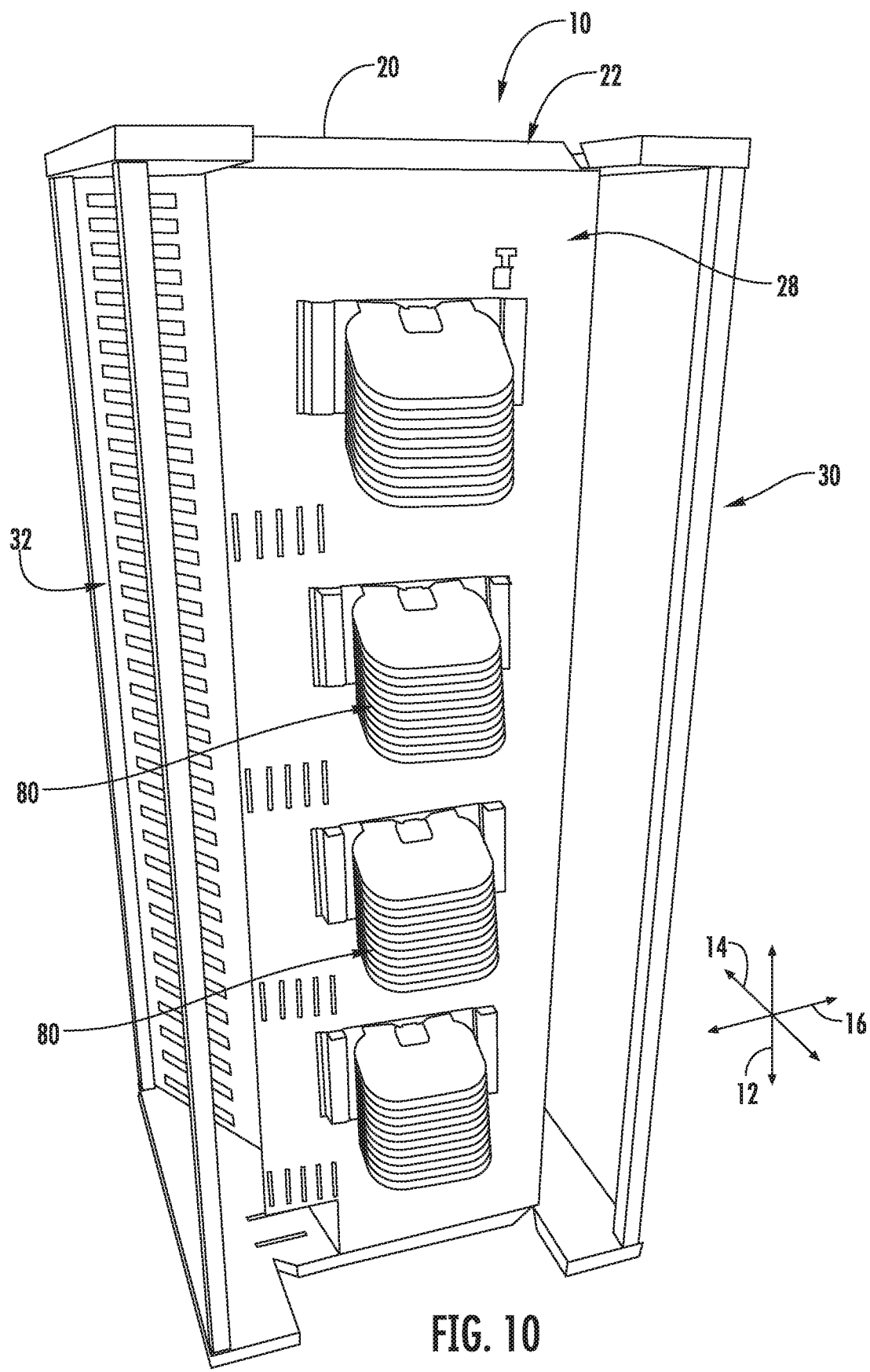
FIG. 10 is a perspective rear view of an optical distribution frame in accordance with embodiments of the present disclosure.
Figure 11:
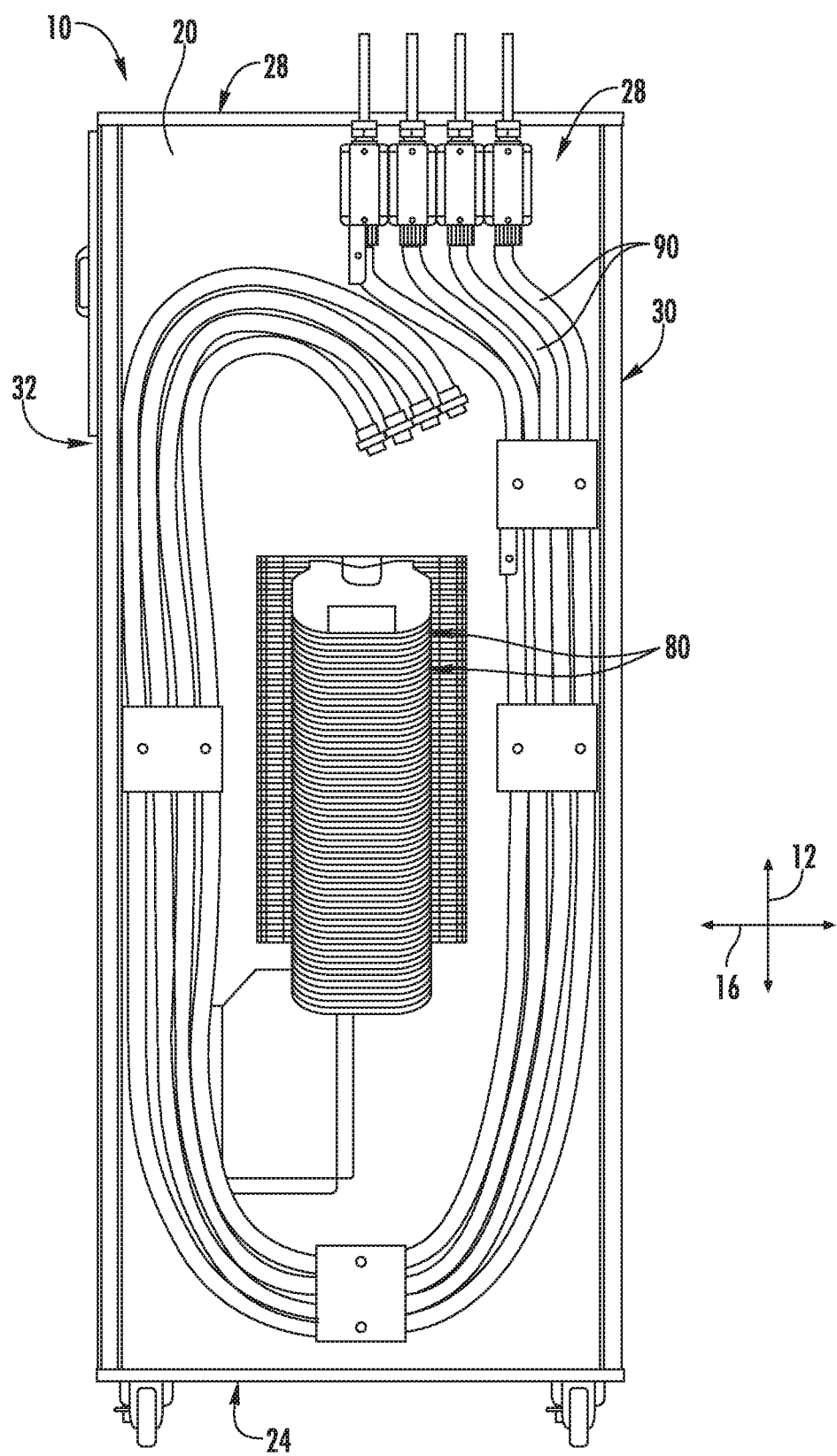
FIG. 11 is a rear view of an optical distribution frame, with input cables shown being routed to splice trays, in accordance with embodiments of the present disclosure.
Figure 12:
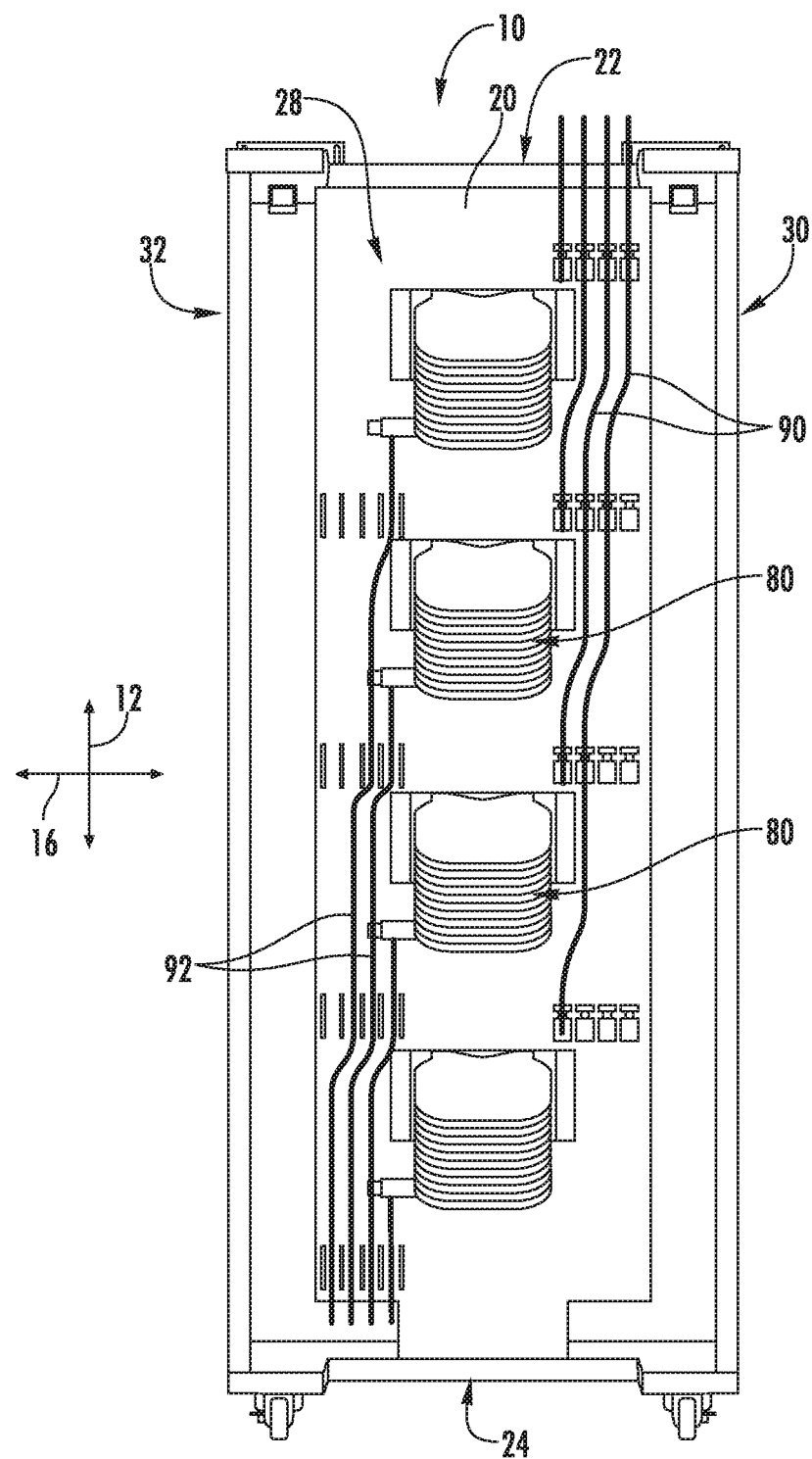
FIG. 12 is a rear view of an optical distribution frame, with input cables shown being routed to splice trays and pigtail cables shown being routed from splice trays, in accordance with embodiments of the present disclosure.
Figure 13:
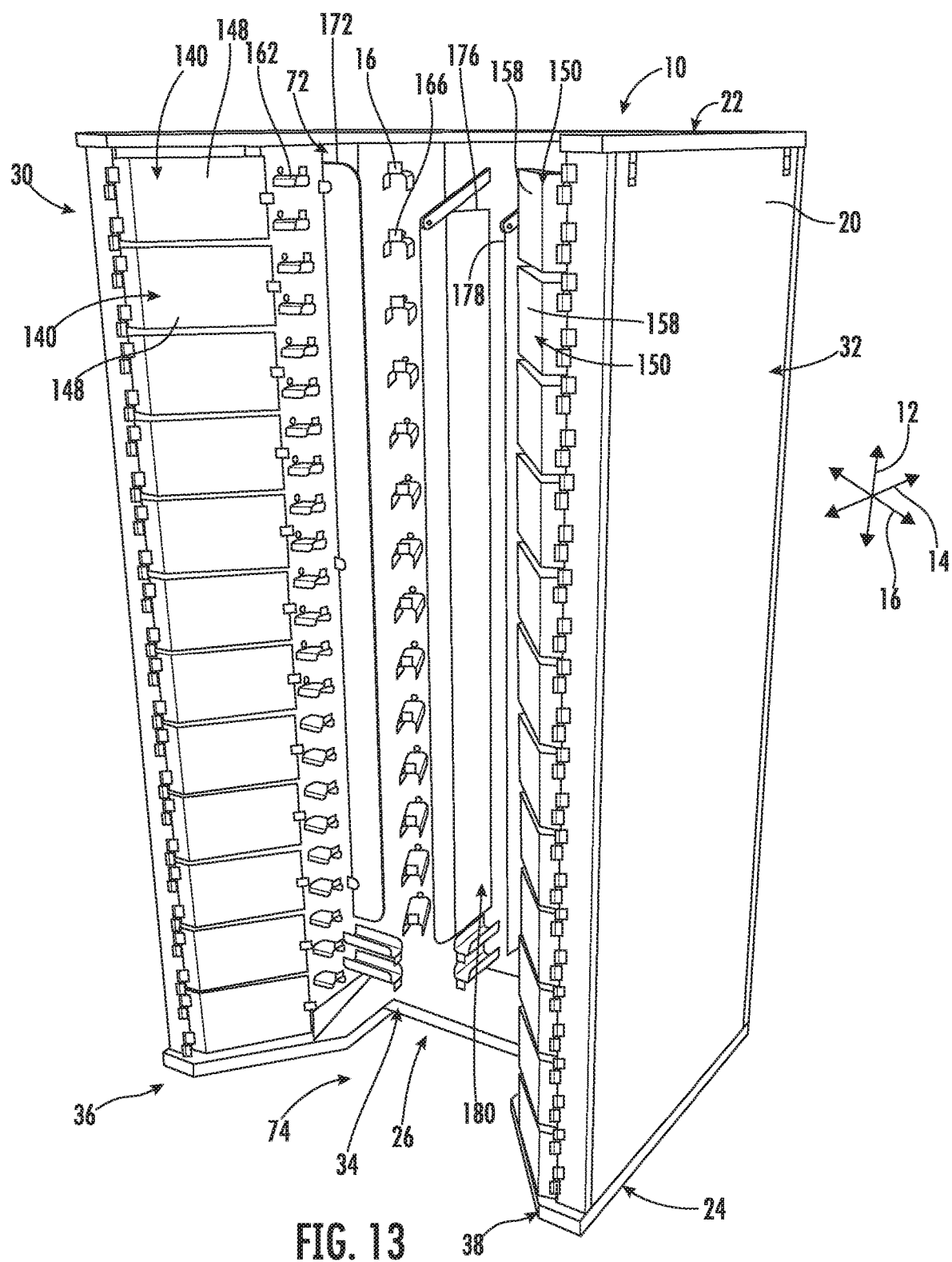
FIG. 13 is a perspective view of an optical distribution frame in accordance with embodiments of the present disclosure.
Figure 14:
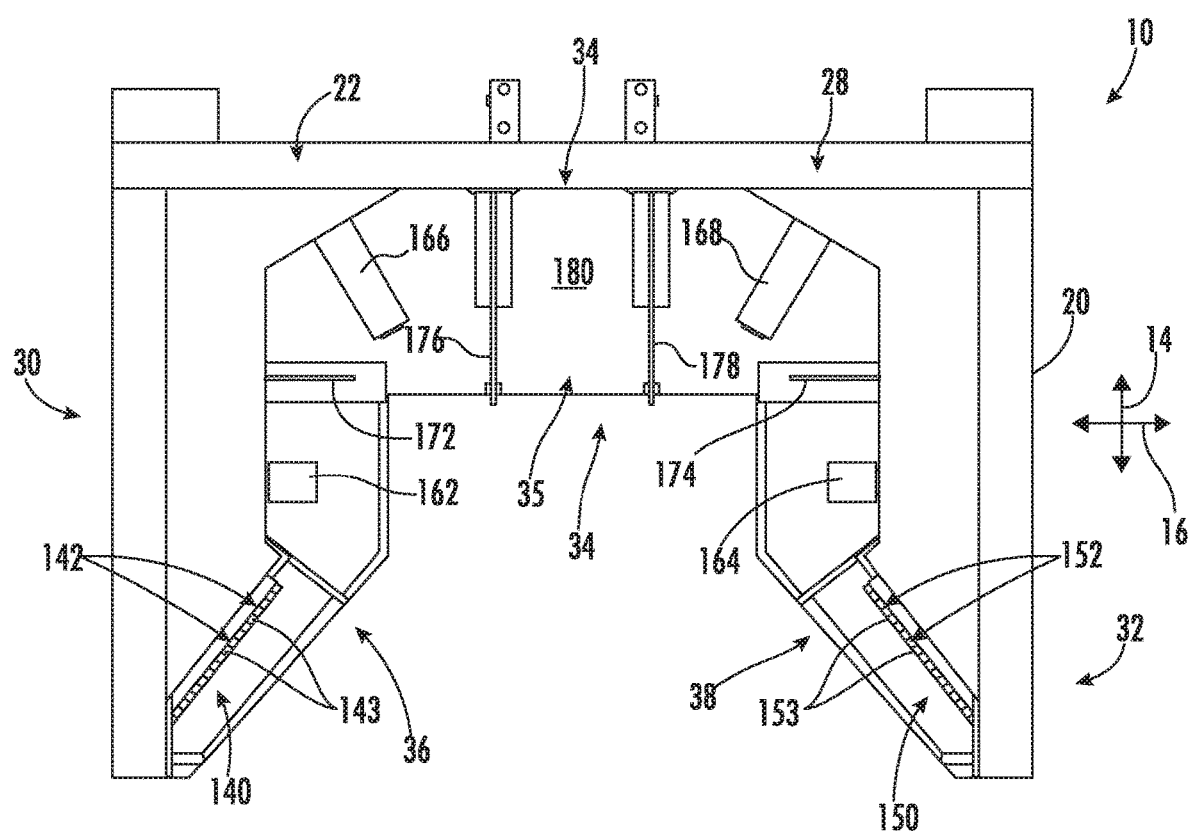
FIG. 14 is a top view of an optical distribution frame in accordance with embodiments of the present disclosure.
Figure 15:
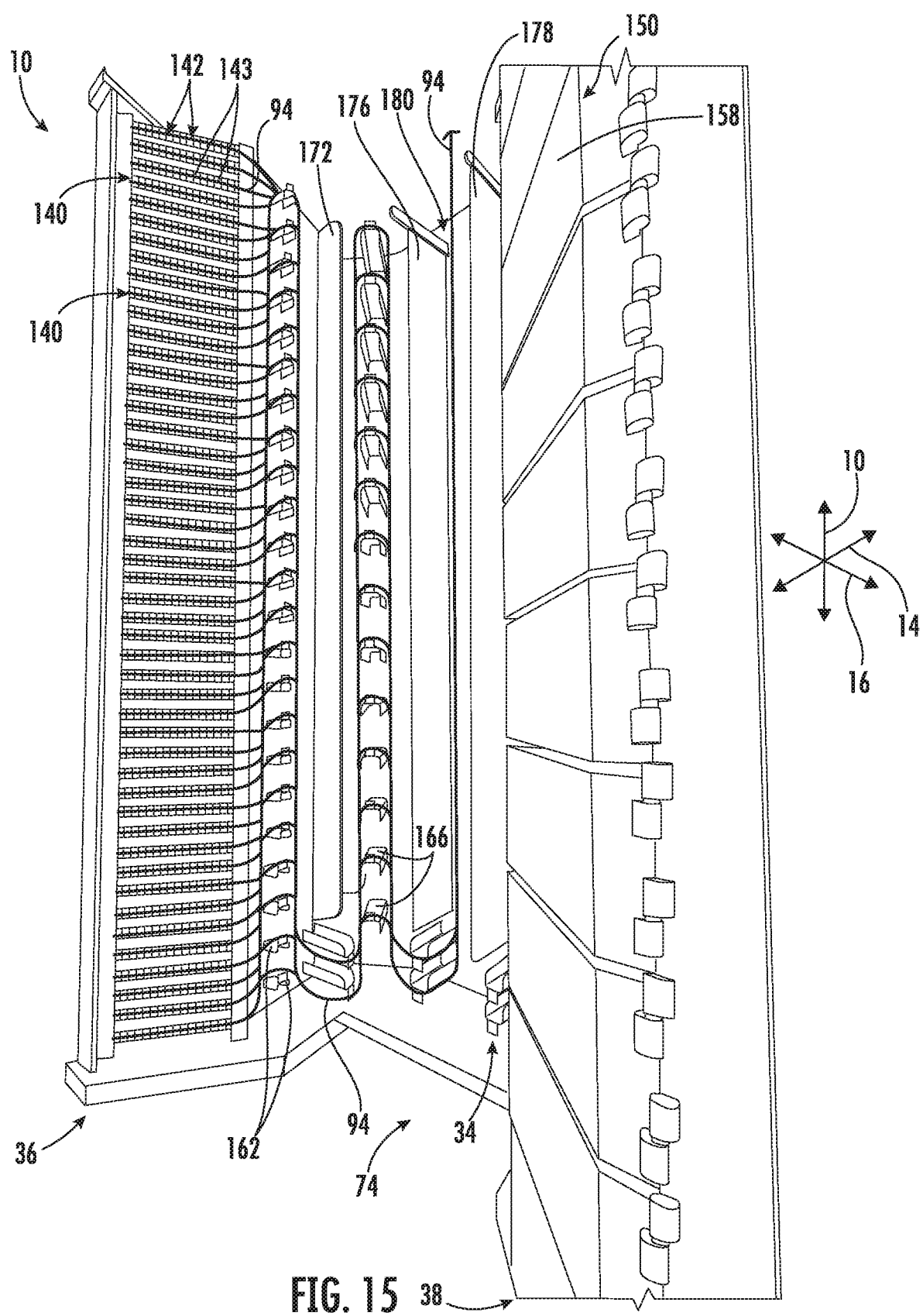
FIG. 15 is a perspective view of an optical distribution frame with panel covers removed in accordance with embodiments of the present disclosure.
Figure 16:
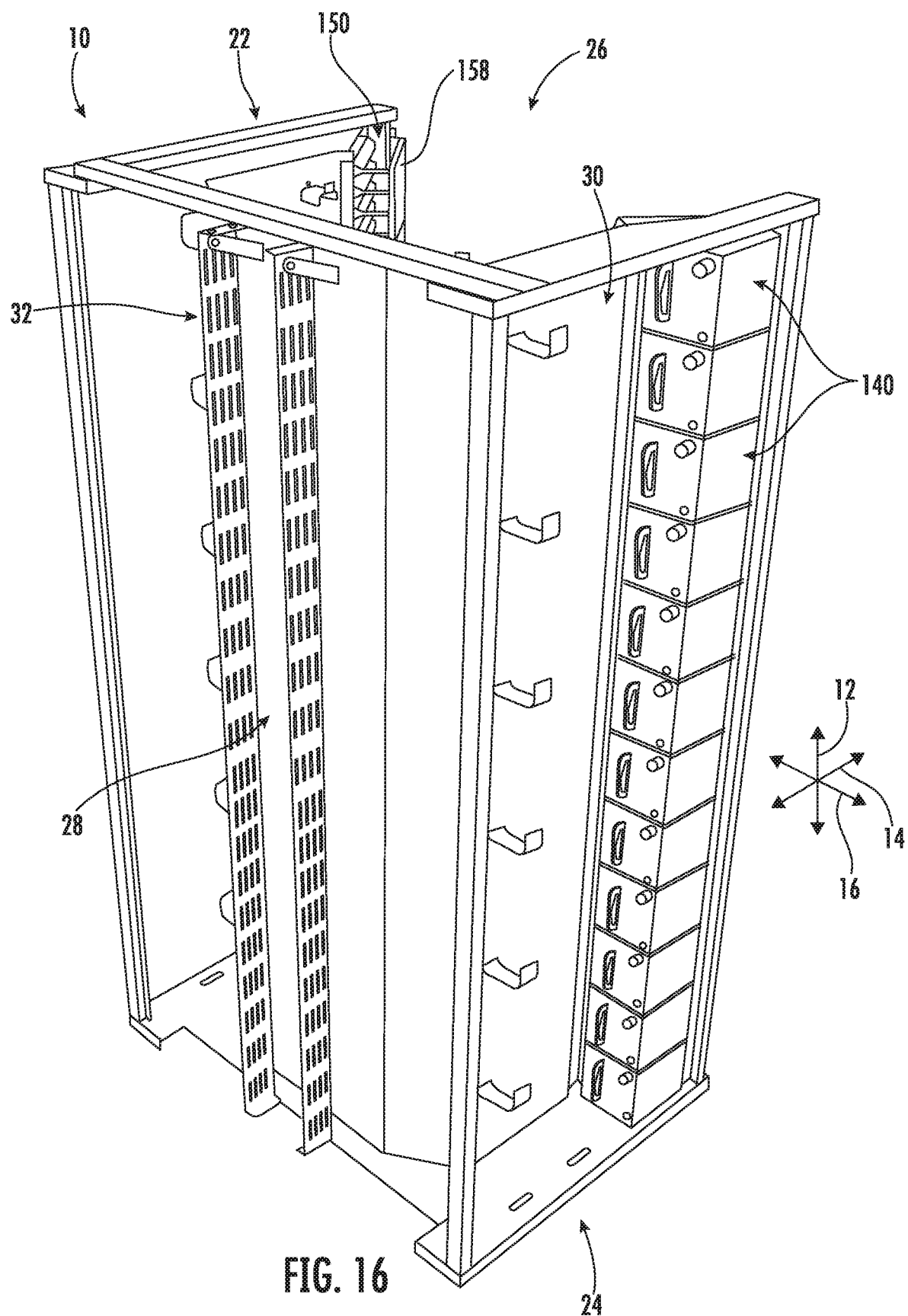
FIG. 16 is a rear perspective view of an optical distribution frame in accordance with embodiments of the present disclosure.

Referring now to FIGS. 1 through 16, embodiments of optical distribution frames 10 in accordance with the present disclosure are provide. Optical distribution frames 10 in accordance with the present disclosure may advantageously include improved organizational capabilities, and may further be capable of meeting minimum space and fiber count requirements of large scale data center customers.

For example, in some embodiments, optical distribution frames 10 in accordance with the present disclosure can accommodate 6912 fiber connectors in a maximum footprint of 900 millimeters (mm)×900 mm×2300 mm. In order to improve accessibility and tracing of optical fibers, in some embodiments, portions of the front of the optical distribution frames 10 have been angled inwardly, such that the patch bodies (such as patch panels or removable patch modules as discussed herein) mounted thereto face the installer when the installer is adding patch cords 94. In some embodiments, the top and bottom of the frame have been relieved to allow an installer to step inside the frame when working to allow greater visibility and hand access. In some embodiments, the patch cords 94 are guided vertically upward or downward through a central portion and out, in some embodiments for example into overhead containment, to improve visibility and access.

In some embodiments, each patch body has discrete routing indicia, such as a discrete color, symbol, etc., to improved fiber traceability. In some embodiments, there are individual doors to cover each patch body. These doors are removable for ease of use and include routing indicia which match the associated patch body. In some embodiments, the fiber routing area contains routing indicia to designate inbound and outbound cabling so as to limit errors when tracing the fibers. In some embodiments, each section of the fiber routing area has a defined outbound patch cord 94 path to ensure no overlap between sections and improve traceability if removal of a patch cord 94 is required at a later date.

In some embodiments, spools and bulkheads are provided in the central portion to define outbound patch cord 94 paths. The locations and distributions of the spools and bulkheads cause the patch cords 94 to be organized along defined fiber routing paths to improved traceability.

In some embodiments, splicing occurs on the rear of the frame, whereas patching occurs on the front of the frame, to improve accessibility. In other embodiments, splicing occurs at remote splicing areas away from the frame.

Optical distribution frames 10 in accordance with the present disclosure define a coordinate system which includes a longitudinal axis 12, a transverse axis 14, and a lateral axis 16, all of which are mutually orthogonal to each other.

An optical distribution frame 10 may include a body 20 which extends along the longitudinal axis 12 between a top 22 and a bottom 24. Further, the body 20 may include a front 26 and a rear 28 which are separated from each other along the transverse axis 14. Still further, the body 20 may include opposing sides 30, 32 which are separated from each other along the lateral axis 16.

The front 26 of optical distribution frames 10 in accordance with the present disclosure generally accommodates various components related to patching and routing of patch cords 94. For example, the front 26 includes a central portion 34, a first outer portion 36, and a second outer portion 38. In exemplary embodiments, the central portion defines a central recess 35, such that a surface of the central portion 34 is recessed along the transverse axis 14 relative to the outer portions 36, 38. The first and second outer portions 36, 38 border the central portion 34, and thus are disposed on opposing sides of the central portion 34 along the lateral axis 16.

In general, first and second outer portions 36, 38 accommodate patch bodies, such as patch panels or removable patch modules, as discussed herein. Further, the central portion accommodates various routing and organizational features. For example, in some embodiments, the central portion 34 accommodates cable retainers which provide routing for patch cords 94 within the central recess 35. In other embodiments, the central portion 34 accommodates spools and bulkheads which provide routing for patch cords 94 within the central recess 35. Accordingly, patching and routing of patch cords 94 is generally facilitated by the front 26 of the optical distribution frame 10.

In exemplary embodiments, the first outer portion 36 and second outer portion 38 are angled inwardly relative to the lateral axis 16 towards each other. Accordingly, planes defined by the first outer portion 36 and second outer portion 38 are each disposed at an angle between the parallel to the lateral axis 16 and parallel to the transverse axis 14, and lines perpendicular to such planes and at the same location along the longitudinal axis 12 will intersect at a location exterior to the body 10 and relatively more proximate the front 26 than the rear 28. For example, angles 37, 39 of the first and second outer portions 36, 38, respectively, relative to the lateral axis 16 may be between 30 degrees and 90 degrees, such as between 35 degrees and 80 degrees, such as between 40 degrees and 70 degrees.

One or more patch bodies may be disposed on the first and second outer portions 36, 38. In some embodiments, for example, as shown in FIGS. 1 through 12, the patch bodies may be patch panels. For example, one or more first patch panels 40 may be disposed on the first outer portion 36, and one or more second patch panels 50 may be disposed on the second outer portion 48. Each first panel 40 may include a plurality of adapters 42, and each second panel 50 may include a plurality of adapters 52. Adapters 42, 52 may each include opposing front ports 43, 53, and rear ports 44, 54, respectively. The front port 43, 53 and rear port 44, 54 may each accommodate an end of a fiber optic cable, such as a fiber optic connector or a ferrule, such that the adapter 42, 52 provides a connection location between optical fibers to which such connectors are connected. The ports 43, 44, 53, 54 may accommodate any suitable connectors, such as SC connectors, LC connectors, MU connecters, etc., or may accommodate any suitable ferrule sizes or other suitable fiber optic cable end apparatus. In some particular exemplary embodiments, the ports 43, 44, 53, 54 accommodate LC connectors, and the adapters 42, 52 are thus considered LC adapters.

Each first patch panel 40 may include one or more rows and one or more columns of adapters 42. Each second patch panel 50 may include one or more rows and one or more columns of adapters 52. Each first patch panel 40, and thus the array of adapters 42, may be aligned in the plane of the first outer portion 36. Accordingly, the ports 43, 44 of each adapter 42 may be aligned along a line perpendicular to such plane. Each second patch panel 50, and thus the array of adapters 52, may be aligned in the plane of the second outer portion 38. Accordingly, the ports 53, 54 of each adapter 52 may be aligned along a line perpendicular to such plane.

As shown, the ports 43, 53 may be accessible from and through the front 26. Ports 44, 54 may be accessible from and through the opposing sides 30, 32, respectively.

Each first patch panel 40 and/or second patch panel 50 may further include a plurality of routing rings 60. The routing rings 60 may accommodate therein patch cords 94 which are connected to the associate patch panel 40, 50 (such as a port 43, 53 thereof) and which are being routed from the patch panel 40, 50 to the central portion 34. Accordingly, routing rings 60 may facilitate the organization, tracking, and routing of such patch cords 94. In exemplary embodiments, the routing rings 60 of a patch panel 40, 50 may be positioned proximate the central portion 34 relative to the plurality of adapters 42, 52 of the patch panel 40, 50, and may thus be relatively closer to the central portion 34 than the respective adapters of such patch panel. Routing from the adapters 42, 42 to the central portion 34 is thus facilitated.

In exemplary embodiments, a plurality of first patch panels 40 are provided. Further, each first patch panel 40 may include a routing indicia 46. The routing indicia 46 is generally a feature of the first patch panel 40 which differentiates the first patch panel 40 from one or more others of the first patch panels 40. The routing indicia 46 further advantageously facilitates improved and efficient organization, tracking, and routing of patch cords 94 as the patch cords 94 extend from an adapter 42 of the first patch panel 40 to and through the central portion 34, as discussed herein. In exemplary embodiments, the routing indicia 46 of each of the plurality of first patch panels 40 may be different from the others of the plurality of first patch panels 40. Thus, each first patch panel 40 of the plurality of first patch panels 40 may have a distinct routing indicia 46.

Similarly, in exemplary embodiments, a plurality of second patch panels 50 are provided. Further, each second patch panel 50 may include a routing indicia 56. The routing indicia 56 is generally a feature of the second patch panel 50 which differentiates the second patch panel 50 from one or more others of the second patch panels 50. The routing indicia 56 further advantageously facilitates improved and efficient organization, tracking, and routing of patch cords 94 as the patch cords 94 extend from an adapter 52 of the second patch panel 50 to and through the central portion 34, as discussed herein. In exemplary embodiments, the routing indicia 56 of each of the plurality of second patch panels 50 may be different from the others of the plurality of second patch panels 50. Thus, each second patch panel 50 of the plurality of second patch panels 50 may have a distinct routing indicia 56.

In some embodiments, the routing indicia 46 of a first patch panel 40 and the routing indicia 56 of a second patch panel 50 may match. Accordingly, one or more pairs of first and second patch panels 40, 50 may be provided. Alternatively, the routing indicia 56 of each second patch panel 50 may be different from the routing indicia 46 of each first patch panel 40.

In exemplary embodiments, the plurality of first patch panels 40 may be distinct along the longitudinal axis 12. Accordingly, each first patch panel 40 in a column along the longitudinal axis 12 may have a distinct routing indicia 46 from others in such column. Further, in exemplary embodiments, the plurality of second patch panels 50 may be distinct along the longitudinal axis 12. Accordingly, each second patch panel 50 in a column along the longitudinal axis 12 may have a distinct routing indicia 56 from others in such column. In some exemplary embodiments, a first patch panel 40 and second patch panel 50 at the same location along the longitudinal axis 12 may have the same routing indicia 46, 56.

In some embodiments, removable panel covers 48, 58 may be provided on each patch panel 40, 50. The panel covers 48, 58 may connect to and cover the patch panels 40, 50 at the front 26, thus protecting the adapters 42, 52 thereof. In exemplary embodiments, each panel cover 48, 58 may include the routing indicia 46, 56 of the associated patch panel 40, 50.

As discussed, patch cords 94 may be routed from the patch bodies, which in some embodiments may be patch panels 40, 50 or alternatively may be removable patch modules, to the central portion 34. In some embodiments, a plurality of cable retainers 62 may be disposed on the central portion 34. Each cable retainer 62 may extend into and be disposed within the central recess 35. The cables retainers 62 retain the patch cords 94 within the central recess 35, and provide routing paths for the patch cords 94 within and through the central recess 35. The routing paths may in exemplary embodiments be generally along the longitudinal axis 12, such as towards and through the top 22 or bottom 24 thereof.

The cable retainers 62 may include a plurality of groups of cable retainers 62, with each group including a plurality of cable retainers 62. Each group of cable retainers 62 may provide routing paths for one or more patch cords 94, and may thus be positioned in a longitudinal array (along the longitudinal axis 12) of one or more columns of cable retainers 62. In exemplary embodiments, for example, the groups of cable retainers 62 may be distinct along the lateral axis 16, such that each column of cable retainers 62 includes only a single group of cable retainers 62. Further, the patch cords 94 routed through each group of cable retainers 62 may be distinct from those routed through other groups of cable retainers 62.

In some embodiments, each group of cable retainers 62 may include a routing indicia 66. The routing indicia 66 is generally a feature of the group of cable retainers 62 which differentiates the group of cable retainers 62 from one or more others of the groups of cable retainers 62. The routing indicia 66 further advantageously facilitates improved and efficient organization, tracking, and routing of patch cords 94 as the patch cords 94 extend through the central portion 34. In exemplary embodiments, the routing indicia 66 of each of the plurality of group of cable retainers 62 may be different from the others of the plurality of group of cable retainers 62. Thus, each group of cable retainers 62 of the plurality of group of cable retainers 62 may have a distinct routing indicia 66.

In exemplary embodiments, the routing indicia 66 of a group of cable retainers 62 may match the routing indicia 46 and/or 56 of a first patch panel 40 and/or a second patch panel 50. Such matching of a routing indicia 66 with a routing indicia 46 and/or 56 advantageously facilitates improved and efficient organization, tracking, and routing of patch cords 94 as the patch cords 94 extend from an adapter 42 or 52 to and through the central portion 34. For example, when patch cords 94 are installed, the installer advantageously routes the patch cords 94 from each patch panel 46 and/or 56 only to the group of cable retainers 62 having a matching routing indicia 66 as the routing indicia 46 or 56 of that patch panel 46 or 56.

In exemplary embodiments as shown, the routing indicia 46, 56 is a color that is applied to the first patch panel 40, second patch panel 50, and/or group of cable retainers 62. Accordingly, in exemplary embodiments, the color applied to each first patch panel 40 may be different from the color of the others of the first patch panels 40, the color applied to each second patch panel 50 may be different from the color of the others of the second patch panels 50, and/or the color applied to each group of cable retainers 62 may be different from the color of the other groups of cable retainers 62. Alternatively, the routing indicia 46, 56 may be a symbol, such as a letter or number, a texture, a design, or another suitable indicia which can be applied in a different manner to each component of a plurality of components (i.e. first patch panels 40, second patch panels 50, and/or groups of cable retainers 62) to distinguish that component from others of that component.

In some embodiments, a plurality of dividers 68 may be provided on the central portion 34, such as within the central recess 35. The dividers 68 may partially segregate the groups of cable retainers 62 from each other. For example, the various groups of cable retainers 62 may extend along the longitudinal axis 12 through different distances within the central recess 35, with bottom-most cable retainers 62 of certain groups being closer to the bottom 24 than bottom-most cable retainers 62 of other groups. Dividers 68 may be disposed between the bottom 24 and the bottom-most cable retainers 62 of such groups, to prevent patch cords 94 from inadvertently being routed from one group into another group of cable retainers 62 as the patch cords 94 are routed in the central recess 35 along the longitudinal axis 12.

In some embodiments, for example, as shown in FIGS. 13 through 16, the patch bodies may be removable patch modules. Removable patch modules are generally sealed patch bodies in which a plurality of adapters are provided. The modules can be easily removed from and/or added to the frame 10 as desired depending on the desired number of fiber optic connections needed for a particular application. As shown, one or more first patch modules 140 may be disposed on the first outer portion 36, and one or more second patch modules 150 may be disposed on the second outer portion 48. Each first module 140 may include a plurality of adapters 142, and each second module 150 may include a plurality of adapters 152. Adapters 142, 152 may each include opposing front ports 143, 153, and rear ports (inside the modules and not shown) respectively. The front port 143, 153 and rear port may each accommodate an end of a fiber optic cable, such as a fiber optic connector or a ferrule, such that the adapter 142, 152 provides a connection location between optical fibers to which such connectors are connected. The ports 143, 153 may accommodate any suitable connectors, such as SC connectors, LC connectors, MU connecters, etc., or may accommodate any suitable ferrule sizes or other suitable fiber optic cable end apparatus. In some particular exemplary embodiments, the ports 143, 153 accommodate LC connectors, and the adapters 142, 152 are thus considered LC adapters.

Each first patch module 140 may include one or more rows and one or more columns of adapters 142. Each second patch module 150 may include one or more rows and one or more columns of adapters 152. Each first patch module 140, and thus the array of adapters 142, may be aligned in the plane of the first outer portion 36. Accordingly, the ports 143 of each adapter 142 may be aligned along a line perpendicular to such plane. Each second patch module 150, and thus the array of adapters 152, may be aligned in the plane of the second outer portion 38. Accordingly, the ports 153 of each adapter 152 may be aligned along a line perpendicular to such plane. As shown, the ports 143, 153 may be accessible from and through the front 26.

In exemplary embodiments, a plurality of first patch modules 140 are provided. Further, in exemplary embodiments, a plurality of second patch modules 150 are provided. In some embodiments, the patch modules 140, 150 may include routing indicia as discussed above with respect to the patch panels. Alternatively, no such routing indicia is required. In exemplary embodiments, the first modules 140 are arranged in a longitudinal array, and thus aligned along the longitudinal axis 12. Further, in exemplary embodiments, the second modules 150 are arranged in a longitudinal array, and thus aligned along the longitudinal axis 12.

In some embodiments, removable panel covers 148, 158 may be provided on each patch panel 140. The panel covers 148, 158 may connect to and cover the patch panels 140, 150 at the front 26, thus protecting the adapters 142, 152 thereof. In some embodiments, each panel cover 148, 158 may include the routing indicia of the associated patch module 140, 150. Alternatively, no suitable routing indicia is required.

As discussed, patch cords 94 may be routed from the patch bodies, which in some embodiments may be patch panels 40, 50 or alternatively may be removable patch modules 140, 150, to the central portion 34. In some embodiments, a plurality of spools may be disposed on the central portion 34. Each spool may extend into and be disposed within the central recess 35. Further, the plurality of spools may be arranged in one or more longitudinal arrays, and thus aligned in one or more groups extending along the longitudinal axis 12. The spools may provide routing paths for the patch cords 94 within and through the central recess 35.

For example, the plurality of spools may include a plurality of first side spools 162 and a plurality of second side spools 164. The plurality of first side spools 162 may be arranged in a longitudinal array. Further, in exemplary embodiments, each first side spool 162 may be equally spaced apart (i.e. on-center spaced) along the longitudinal axis 12 from neighboring first side spools 162. In some embodiments, for example, the spacing may be between 8 inches and 16 inches, such as between 10 inches and 14 inches, such as 12 inches. Such equal spacing may facilitate routing as discussed herein. The plurality of second side spools 164 may similarly be arranged in a longitudinal array. Further, in exemplary embodiments, each second side spool 164 may be equally spaced apart (i.e. on-center spaced) along the longitudinal axis 12 from neighboring second side spools 164. In some embodiments, for example, the spacing may be between 8 inches and 16 inches, such as between 10 inches and 14 inches, such as 12 inches. Such equal spacing may facilitate routing as discussed herein. Patch cords 94 routed from the patch bodies, such as the removable patch modules 140, 150 as shown, may be routed over the spools 162, 164. For example, patch cords 94 from the first patch module 140 may be routed over the spools 162, and patch cords 94 from the second patch module 150 may be routed over the spools 164.

The plurality of spools may further include a plurality of first central spools 166 and a plurality of second central spools 168. The plurality of first central spools 166 may be arranged in a longitudinal array. Further, in exemplary embodiments, each first central spool 166 may be equally spaced apart (i.e. on-center spaced) along the longitudinal axis 12 from neighboring first central spools 166. In some embodiments, for example, the spacing may be between 8 inches and 16 inches, such as between 10 inches and 14 inches, such as 12 inches. Such equal spacing may facilitate routing as discussed herein. The plurality of second central spools 168 may similarly be arranged in a longitudinal array. Further, in exemplary embodiments, each second central spool 168 may be equally spaced apart (i.e. on-center spaced) along the longitudinal axis 12 from neighboring second central spools 168. In some embodiments, for example, the spacing may be between 8 inches and 16 inches, such as between 10 inches and 14 inches, such as 12 inches. Such equal spacing may facilitate routing as discussed herein. Patch cords 94 routed from the spools 162, 164 may then be routed over the spools 166, 168. For example, patch cords 94 from the first patch module 140 may be routed over the spools 162, and then over the spools 166. Patch cords 94 from the second patch module 150 may be routed over the spools 164, and them over the spools 168.

In exemplary embodiments, spools 162 are generally proximate the first patch bodies (such as the first patch modules 140 as shown) relative to the spools 166. Similarly, in exemplary embodiments, spools 164 are generally proximate the second patch bodies (such as the second patch modules 150 as shown) relative to the spools 168.

Further, in some embodiments, a one or more bulkheads may be disposed on the central portion 34. Each bulkhead may extend into and be disposed within the central recess 35. Further, each bulkhead may generally provide a partition between certain areas of the central portion, such as areas in which spools are provided. The bulkheads may further provide routing paths for the patch cords 94 within and through the central recess 35.

For example, a first side bulkhead 172 may be disposed between the plurality of first side spools 162 and the plurality of first central spools 166. Accordingly, patch cords 94 routed from the first side spools 162 to the first central spools 166 may pass over or under the first side bulkhead 172 between the spools 162 and spools 166. Similarly, a second side bulkhead 174 may be disposed between the plurality of second side spools 164 and the plurality of second central spools 168. Accordingly, patch cords 94 routed from the second side spools 164 to the second central spools 166 may pass over or under the second side bulkhead 174 between the spools 164 and spools 168.

Still further, a central channel 180 of the central portion 34 (which may be part of the central recess 35) may be defined. The central channel 180 may be defined by a first central bulkhead 176 and a second central bulkhead 178. The first central bulkhead 176 may be disposed between the first central spools 166 and the central channel 180. Similarly, the second central bulkhead 178 may be disposed between the second central spools 168 and the central channel 180. Accordingly, patch cords 94 routed from the first central spools 166 to the central channel 180 may pass over or under the first central bulkhead 176 between the spools 166 and recess 180. Similarly, patch cords 94 routed from the second central spools 168 to the central channel 180 may pass over or under the second central bulkhead 178 between the spools 168 and recess 180.

Within the recess 180, routing paths for the patch cords 94 may in exemplary embodiments be generally along the longitudinal axis 12, such as towards and through the top 22 or bottom 24 thereof.

Notably, the known distances between spools and the use of bulkheads may facilitate organization and tracking of the patch cords. For example, because the patch cords 94 have defined lengths, these lengths may generally cause the patch cords to route to specific spools of the plurality of central spools 166 or 168 after being routed through the side spools 162 or 164 and side bulkhead 172, 174, respectively.

As discussed, the body 20 extends along a longitudinal axis between a top 22 and a bottom 24. In exemplary embodiments, each of the top 22 and the bottom 24 defines a central cutout 72, 74. The first outer portion 36, second outer portion 38, and central portion 34 may border and define the cutouts 72, 74. Accordingly, a profile of the top 22 and the bottom 24 at the front 26 mirrors the profile of the front 26. These cutouts 72, 74 advantageously allow for an installer to "step in" to the body 20 during installation, thus facilitating ease of organization, traceability, and efficiency.

In some embodiments, patching generally occurs at the front 26, while splicing occurs at the rear 28. Accordingly, a plurality of splice trays 80 may be provided. Each splice tray 80 may be disposed on the rear 28. Splicing of input cables 90 to pigtails 92 may occur in the splice trays 80. In alternative embodiments, splicing may occur at remote locations separate from the frame 10.

In general, input cables 90, pigtails 92, and patch cords 94 are fiber optic cables, each of which includes one or more optical fibers disposed within an outer jacket. In exemplary embodiments, each input cable 90 includes a plurality of optical fibers. Pigtails 92 and patch cords 94 may include only a single optical fiber or more than one optical fibers. In use, the input cables 90 are routed proximate the rear 28 to the splice trays 80, and splicing of optical fibers of the input cables 90 to optical fibers of the pigtails 92 may occur within the splice trays 80. The pigtails 80 may then be routed to the patch bodies and connected to ports of the adapters thereof. The patch cords 94 may be connected to front ports of the adapters to connect optical fibers of the patch cords 94 to optical fibers of the pigtails 80. The patch cords 94 may then be routed from the adapters to and through the cable retainers and/or spools and bulkheads, as discussed herein, and may exit the frame 10 through the top 22 or bottom 24 thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An optical distribution frame defining a coordinate system comprising a mutually orthogonal longitudinal axis, transverse axis, and lateral axis, comprising:
    a body extending along the longitudinal axis between a top and a bottom, the body comprising a front and a rear separated from each other along the transverse axis, the front comprising a central portion, a first outer portion, and a second outer portion, the first and second outer portions bordering the central portion and angled inwardly relative to the lateral axis towards each other;
    a first patch body disposed on the first outer portion, the first patch body comprising a plurality of adapters; and
    a second patch body disposed on the second outer portion, the second patch body comprising a plurality of adapters, and
        a plurality of cable retainers disposed on the central portion, the plurality of cable retainers comprises a plurality of groups of cable retainers, each of the plurality of groups of cable retainers comprising a routing indicia, and wherein the routing indicia of each group of cable retainers is different from the others of the plurality of groups of cable retainers.

2. The optical distribution frame of claim 1, wherein the first patch body and second patch body are patch panels.

3. The optical distribution frame of claim 1, wherein the first patch body and second patch body each comprise a plurality of routing rings.

4. The optical distribution frame of claim 3, wherein the routing rings are positioned proximate the central portion relative to the plurality of adapters in each of the first and second patch bodies.

5. The optical distribution frame of claim 1, wherein:
    the first patch body is a plurality of first patch bodies, each of the plurality of first patch bodies comprising a routing indicia, wherein the routing indicia of each of the plurality of first patch bodies is different from the others of the plurality of first patch bodies; and
    the second body panel is a plurality of second patch bodies, each of the plurality of second patch bodies comprising a routing indicia, wherein the routing indicia of each of the plurality of second patch bodies is different from the others of the plurality of second patch bodies.

6. The optical distribution frame of claim 5, wherein the routing indicia of each group of cable retainers matches the routing indicia of one of the plurality of first patch bodies and one of the plurality of second patch bodies.

7. The optical distribution frame of claim 5, wherein the plurality of first patch bodies are distinct along the longitudinal axis and the plurality of second patch bodies are distinct along the longitudinal axis.

8. The optical distribution frame of claim 1, wherein the groups of cable retainers are distinct along the lateral axis.

9. The optical distribution frame of claim 1, further comprising a plurality of dividers disposed on the central portion, the plurality of dividers partially segregating the plurality of groups of cable retainers from each other.

10. The optical distribution frame of claim 1, wherein the top and the bottom each define a central cutout, wherein the first outer portion, second outer portion, and central portion border the central cutouts.

11. The optical distribution frame of claim 1, wherein the first patch body and the second patch body are removable patch modules.

12. The optical distribution frame of claim 1, further comprising a plurality of spools disposed in the central portion.

13. The optical distribution frame of claim 12, wherein the plurality of spools comprises a plurality of first side spools and a plurality of first central spools.

14. The optical distribution frame of claim 13, further comprising a bulkhead panel disposed between the plurality of first side spools and the plurality of first central spools.

15. The optical distribution frame of claim 12, further comprising a bulkhead panel disposed between the plurality of first central spools and a central channel defined in the central portion.

16. An optical distribution frame defining a coordinate system comprising a mutually orthogonal longitudinal axis, transverse axis, and lateral axis, comprising:
    a body extending along the longitudinal axis between a top and a bottom, the body comprising a front and a rear separated from each other along the transverse axis, the front comprising a central portion, a first outer portion, and a second outer portion, the first and second outer portions bordering the central portion and angled inwardly relative to the lateral axis towards each other;
    a first patch body disposed on the first outer portion, the first patch body comprising a plurality of adapters; and a second patch body disposed on the second outer portion, the second patch body comprising a plurality of adapters;

a plurality of spools disposed in the central portion, wherein the plurality of spools comprises a plurality of first side spools and a plurality of first central spools; and a bulkhead panel disposed between the plurality of first side spools and the plurality of first central spools.

17. The optical distribution frame of claim 16, further comprising a bulkhead panel disposed between the plurality of first central spools and a central channel defined in the central portion.

18. The optical distribution frame of claim 16, wherein the first patch body and second patch body are patch panels.

19. The optical distribution frame of claim 16, wherein the first patch body and second patch body each comprise a plurality of routing rings.

20. The optical distribution frame of claim 19, wherein the routing rings are positioned proximate the central portion relative to the plurality of adapters in each of the first and second patch bodies.

21. The optical distribution frame of claim 16, wherein the top and the bottom each define a central cutout, wherein the first outer portion, second outer portion, and central portion border the central cutouts.

22. The optical distribution frame of claim 16, wherein the first patch body and the second patch body are removable patch modules.

* * * * *